US009820046B2

(12) United States Patent
Payal et al.

(10) Patent No.: US 9,820,046 B2
(45) Date of Patent: Nov. 14, 2017

(54) COMPENSATION OF AIR PATH DISTORTIONS USING BACKPROPAGATION

(71) Applicant: Harman International Industries, Inc., Stamford, CT (US)

(72) Inventors: Shreyas Srikanth Payal, Salt Lake City, UT (US); V. John Mathews, Corvallis, OR (US); Douglas J. Button, Simi Valley, CA (US); Ajay Iyer, Murray, UT (US); Russell H. Lambert, Highland, UT (US)

(73) Assignees: HARMAN INTERNATIONAL INDUSTRIES, INCORPORATED, Stamford, CT (US); UNIVERSITY OF UTAH RESEARCH FOUNDATION, Salt Lake City, UT (US)

( * ) Notice: Subject to any disclaimer, the term of this patent is extended or adjusted under 35 U.S.C. 154(b) by 0 days.

(21) Appl. No.: 15/130,794

(22) Filed: Apr. 15, 2016

(65) Prior Publication Data

US 2016/0345094 A1 Nov. 24, 2016

Related U.S. Application Data

(60) Provisional application No. 62/230,020, filed on May 22, 2015.

(51) Int. Cl.
*H04B 15/00* (2006.01)
*H04R 3/04* (2006.01)
(Continued)

(52) U.S. Cl.
CPC ............... *H04R 3/04* (2013.01); *H04R 27/00* (2013.01); *H04R 29/001* (2013.01); *H04R 29/007* (2013.01)

(58) Field of Classification Search
CPC ........ H04R 3/04; H04R 29/001; H04R 27/00; H04R 29/007
(Continued)

(56) References Cited

U.S. PATENT DOCUMENTS

2014/0130731 A1 5/2014 Merrell et al.
2014/0140522 A1 * 5/2014 Deng ...................... H04R 3/08 381/59

OTHER PUBLICATIONS

B. Lombard, D. Matignon, and Y. L. Gorrec, "A fractional Burgers equation arising in nonlinear acoustics: theory and numerics", in Proc. NOLCOS—9th IFAC Symp. Nonlinear Control Syst., Toulouse, FR, 2013, pp. 406-411.

(Continued)

*Primary Examiner* — Hemant Patel
(74) *Attorney, Agent, or Firm* — Artegis Law Group, PLLC

(57) ABSTRACT

In one embodiment, a pre-correcting engine generates a pre-corrected signal that may be used to mitigate air path distortions in sounds generated by loudspeaker systems that include loudspeakers coupled to waveguides. In operation, the pre-correcting engine virtually propagates a target signal in a reverse direction from the output of the waveguide to the output of a driver. Notably, the pre-correcting engine implements a propagation distortion compensation model that, when applied to the target signal, corrects for the effects of air path distortions on the target signal. The pre-correcting engine then transmits the pre-corrected signal to the driver. As the driver drives the waveguide based on the pre-corrected signal, effects of the pre-corrected distortions negate effects of air path distortions and the loudspeaker system generates high-fidelity sounds. By contrast, conventional loudspeaker systems that drive the waveguide based on the target signal typically generate lower fidelity sounds that include air path distortions.

20 Claims, 4 Drawing Sheets

(51) Int. Cl.
*H04R 29/00* (2006.01)
*H04R 27/00* (2006.01)

(58) Field of Classification Search
USPC ...... 381/94.1–94.9, 349–350, 58, 59, 61–63, 381/66, 71.1, 71.8–71.14, 96, 101–104, 381/108; 700/94
See application file for complete search history.

(56) References Cited

OTHER PUBLICATIONS

F. M. Pestorius, "Propagation of Plane Acoustic Noise of Finite Amplitude", Ph.d. dissertation, University of Texas at Austin, Austin, TX, 1973.
A. Voishvillo, A. Terekhov, E. Czerwinski, and S. Alexandrov, "Graphing, interpretation, and comparison of results of loudspeaker nonlinear distortion measurements", J. Audio Eng. Soc, vol. 52, No. 4, pp. 332-357, Apr. 2004.

* cited by examiner

Burgers' Partial Differential Equation (PDE) Model
210

The Burgers' equation is a partial differential equation (PDE) used to describe wave propagation assuming progressive planar waves [2] (Ch. 3), [9]. The Burgers' model may be formulated as a boundary-value problem (a signal $p(x = 0, t)$ is defined for $x = 0$, it is desired to compute the pressure, $p(x_1, t)$, at a specific distance $x_1$, $x_1 > 0$) using Lagrangian coordinates as [2] (Ch. 3)

$$\frac{\partial p(x,\tau)}{\partial x} = \frac{\beta p(x,\tau)}{\rho_0 c_0^3}\frac{\partial p(x,\tau)}{\partial \tau} + \frac{\delta}{2c_0^3}\frac{\partial^2 p(x,\tau)}{\partial \tau^2} - b\sqrt{\frac{2}{\pi}}\left(\frac{\partial p(x,\tau)}{\partial \tau} * \frac{1}{\sqrt{\tau}}\right) \qquad (1)$$

where $p$ corresponds to the pressure field at a location $x$. The speed of sound for unperturbed air is given by $c_0$. The Burgers' equation uses $\tau$ corresponding to the moving time frame of reference ($\tau = t - \frac{x}{c_0}$). The parameter $\beta$ is the coefficient of nonlinearity computed as $\beta = \frac{1}{2}(\gamma + 1)$, where $\gamma$ is the ratio of specific heats for an adiabatic process. The parameter $\rho_0$ denotes the air density of undisturbed air and $\delta$ corresponds to the sound diffusivity of air. The boundary layer parameter $b$ is a function of the dimensions of the waveguide and of medium (in this case, air). This last term on the right hand side of (1) arises from the assumption of a thin boundary layer in comparison to the diameter of the waveguide. The parameters $\delta$ and $b$ are computed as $$\delta = \nu\left(\frac{4}{3} + \frac{\mu_B}{\mu} + \frac{\gamma - 1}{Pr}\right), \qquad (2)$$

$$b = \frac{1}{2R}\sqrt{\frac{2\nu}{c_0^3}}\left[1 + \frac{\gamma - 1}{\sqrt{Pr}}\right] \qquad (3)$$

Here, $\nu$ is the kinematic viscosity, $Pr$ is the Prandtl constant, $\mu$ and $\mu_B$ correspond to the shear and bulk viscosities, respectively and $R$ is the radius of the cylindrical waveguide. This wave steepening effect is obtained by the first term on the right hand side of (1). The second and third terms in (1) contribute to the effects of the dissipation and dispersion.

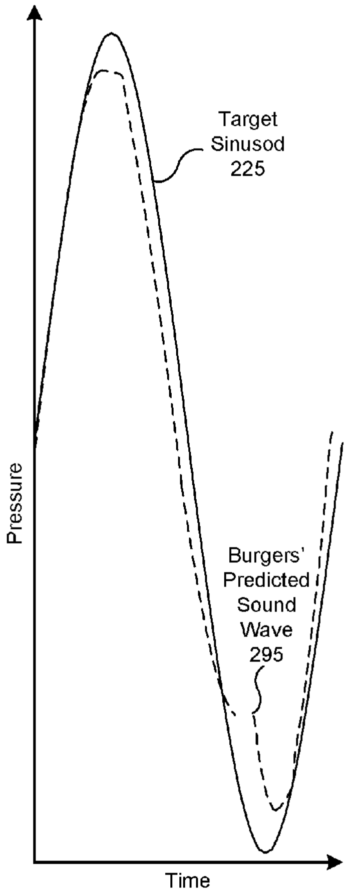

FIGURE 2

Pre-Correcting Engine 140

Initial Condition 350
$p(0, t)$ == target signal 125

Integrator 330

Solution 360
$p(x, t)$ == pre-corrected signal 145

Backpropagation Parameters 340

| | | | |
|---|---|---|---|
| R | 12.7mm | $\beta$ | 1.2 (dimensionless) |
| $c_0$ | 346.57 m $s^{-1}$ | $\gamma$ | 1.4 (dimensionless) |
| $c_{max}$ | $2c_0$ | Pr | 0.707 (dimensionless) |
| $\Delta x$ | 7.2 mm | $\delta$ | $3.84 \times 10^{-5}$ $m^2 s^{-1}$ |
| $P_0$ | 101325 Pa | $\nu$ | $1.53 \times 10^{-5}$ $m^2 s^{-1}$ |
| $\rho$ | 1.2 kg $m^{-3}$ | $b$ | 0.000029862 $m^{-1}$s |
| $\mu_B$ | $0.6\mu$ | $\mu$ | $18.46 \times 10^{-6}$ kg $m^{-1}$ $s^{-1}$ |

Backpropagation Partial Differential Equation (PDE) Model 310

$$\frac{\partial p(x,\tau)}{\partial x} = -1 \times \left[\frac{\beta p(x,\tau)}{\rho_0 c_0^3}\frac{\partial p(x,\tau)}{\partial \tau} + \frac{\delta}{2c_0^3}\frac{\partial^2 p(x,\tau)}{\partial \tau^2} - b\sqrt{\frac{2}{\pi}}\left(\frac{\partial p(x,\tau)}{\partial \tau} * \frac{1}{\sqrt{\tau}}\right)\right] \quad (4)$$

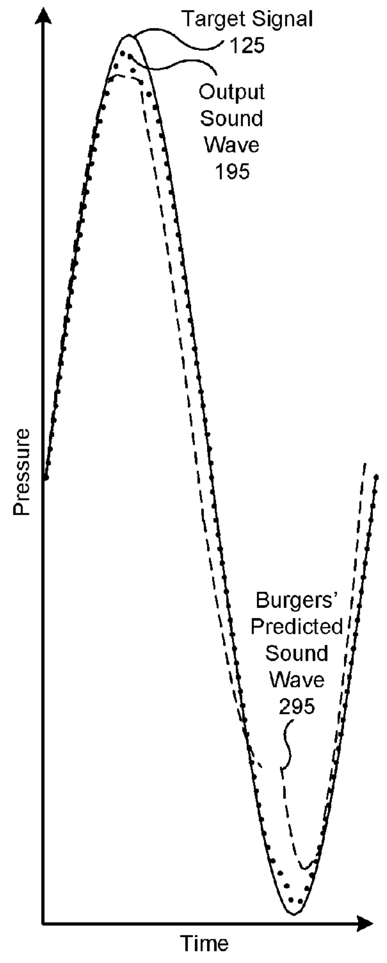

FIGURE 3

COMPENSATION OF AIR PATH DISTORTIONS USING BACKPROPAGATION

CROSS-REFERENCE TO RELATED APPLICATIONS

This application claims benefit of the U.S. Provisional Patent Application having Ser. No. 62/230,020 and filed on May 22, 2015. The subject matter of this related application is hereby incorporated herein by reference.

BACKGROUND

Field of the Various Embodiments

The various embodiments relate generally to loudspeaker systems and, more specifically, to compensation of air path distortions using backpropagation.

Description of the Related Art

Many loudspeaker systems that are designed to project sound for relatively long distances implement waveguides that are attached to acoustic drivers, also referred to as loudspeakers. Such loudspeaker systems are used to supply sound for many common events, including rock concerts, sporting events, and the like. The driver transforms electrical audio signals into sound waves. The shape of the waveguide confines the emitted sound waves to a specified region.

One drawback of the conventional design described above is that, at high sound pressure levels, the speed of sound in the waveguide changes and distorts the sound waves propagating through the waveguide. More specifically, sound waves propagate in air via compressions and rarefactions of air modules. As a result, within the waveguide, the speed of sound varies based on the sound pressure level of the sound waves, the shape of the waveguide, and the properties of air included in the waveguide. In operation, as a sound wave propagates through the waveguide, variations in the speed of sound in the air path lead to intermodulation and harmonic distortions in the sound wave. Such air path distortions degrade the quality of the sound produced via the waveguide, which hinders the ability of the loudspeaker system to generate high fidelity sound.

As the foregoing illustrates, more effective techniques for increasing the fidelity of sound emitted from loudspeakers that are coupled to waveguides would be useful.

SUMMARY

One embodiment sets forth a method for increasing a fidelity of sound emitted from an audio system. The method includes configuring a propagation distortion compensation model based on one or more parameters associated with a waveguide included in the audio system, wherein the propagation distortion compensation model corrects for a mechanism that generates air path distortions attributable to wave propagation in waveguides; applying the propagation distortion compensation model to a target signal to generate a pre-corrected signal; and transmitting the pre-corrected signal to the audio system for generating sound corresponding to the target signal.

Further embodiments provide, among other things, a computer-readable medium and a system configured to implement the method set forth above.

At least one advantage of the disclosed techniques is that driving audio systems that include loudspeakers coupled to waveguides using pre-corrected signals effectively mitigates air path distortions attributable to wave propagation in waveguides. In particular, the pre-corrected signal compensates for wave steepening distortions caused by variations in the speed of sound within the waveguide. Consequently, driving the audio system based on the pre-corrected signal enables the audio system to emit high fidelity sound at high volumes.

BRIEF DESCRIPTION OF THE DRAWINGS

So that the manner in which the above recited features of the various embodiments can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting in scope, for the various embodiments may admit to other equally effective embodiments.

FIG. 2 is an example of air path distortions introduced as a sinusoidal input sound wave propagates through the waveguide of FIG. 1, according to various embodiments;

FIG. 3 is a more detailed description of the pre-correcting engine of FIG. 1, according to various embodiments.

DETAILED DESCRIPTION

In the following description, numerous specific details are set forth to provide a more thorough understanding of the various embodiments. However, it will be apparent to one of skill in the art that the various embodiments may be practiced without one or more of these specific details.

System Overview

Figure 1:
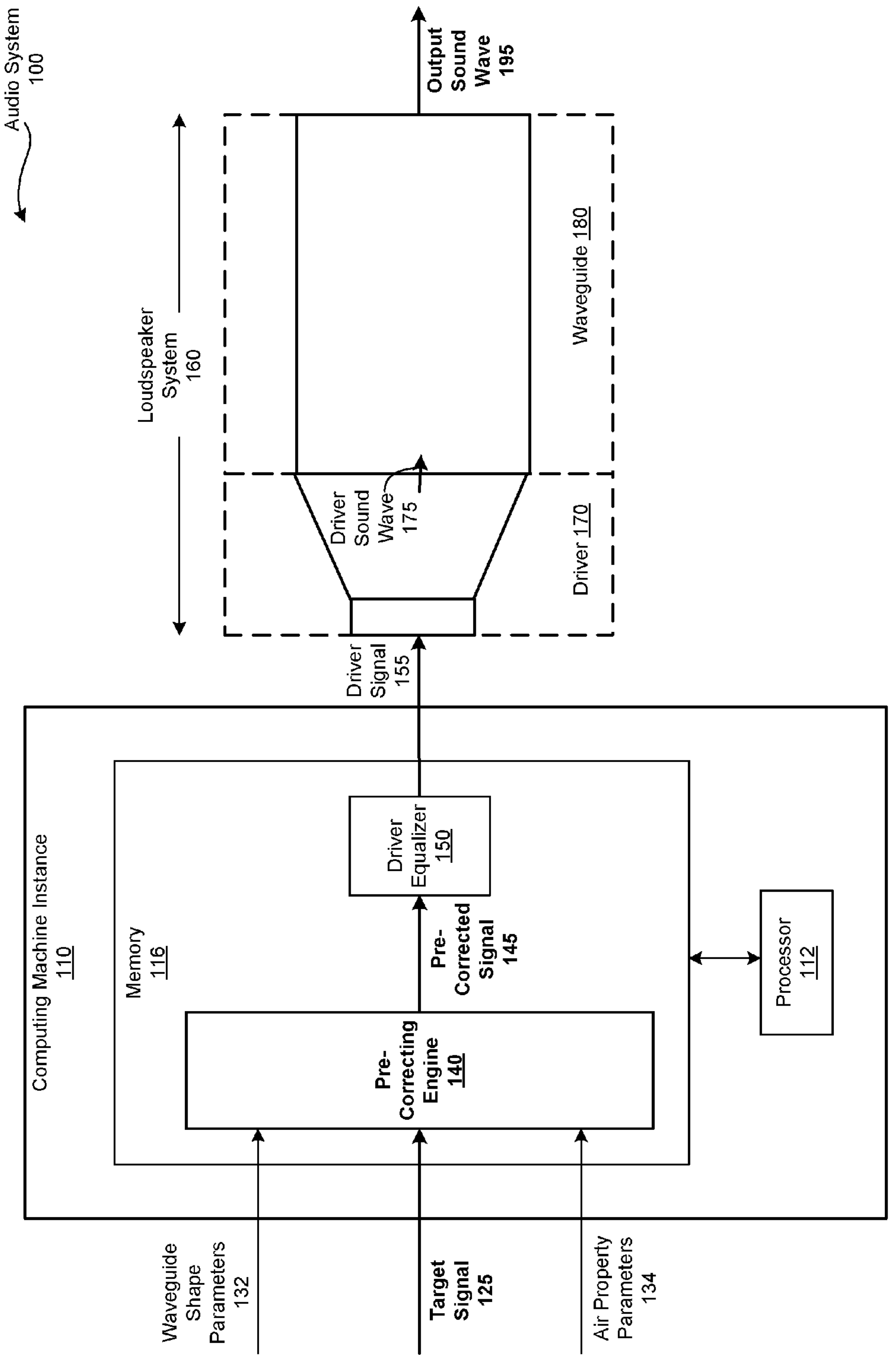
FIG. 1 is a conceptual illustration of an audio system configured to implement one or more aspects of the various embodiments.

FIG. 1 is a conceptual illustration of an audio system 100 configured to implement one or more aspects of the various embodiments. As shown, the audio system 100 includes a loudspeaker system 160 and a computing machine instance 110. In alternate embodiments, the audio system 100 may include any number of loudspeaker systems 160 and any number of computing machine instances 110. In various embodiments, the audio system 100 may include any number and type of audio equipment in any combination.

The loudspeaker system 160 is designed to transform electrical audio signals into sounds characterized by relatively high sound pressure levels (SPLs). The sound pressure level is commonly referred to as the volume. Such loudspeaker systems 160 are widely used in the audio systems 100 that are tailored to deliver intelligible sound volumes to audiences dispersed across large areas, such as spectators at rock concerts held in auditoriums. As shown, the loudspeaker system 160 includes, without limitation, a driver 170 and a waveguide 180 that is coupled to the driver 170. In alternate embodiments, the loudspeaker system 160 may include any number of drivers 170 coupled to any number of waveguides 180 in any combination.

The driver 170, is a transducer that converts an electrical driver signal 155 to a driver sound wave 175. The driver 170 is commonly referred to as a loudspeaker. In response to the electrical driver signal 155, the driver 170 vibrates a diaphragm forwards and backwards. The motion of the diaphragm generates pressure differentials in the air in front of the diaphragm that propagates as the driver sound wave 175. To amplify the driver sound wave 175, the driver 170 is coupled to the waveguide 180. The driver 170 may be coupled to the waveguide 180 in any technically feasible fashion. For example, in some embodiments, the driver 170 may be threaded onto the waveguide 180. In other embodiments, the driver 170 and the waveguide 180 may be mounted abutting each other in a speaker enclosure.

The shape of the waveguide 180 confines the driver sound wave 175 to an air path. After propagating through the waveguide 180 the driver sound wave 175 evolves and is eventually emitted from the loudspeaker system 160 as an output sound wave 195. As intended, the SPL of the output sound wave 195 is lower than the SPL of the driver sound wave 175. However, the output sound wave 195 also includes distortions that are not present in the driver sound wave 175. More precisely, as the driver sound wave 175 propagates through the waveguide 180, the speed of sound in the waveguide 180 changes and distorts the driver sound wave 175.

As a general matter, sound waves propagate in air via compressions and rarefactions of air modules. Accordingly, within the waveguide 180, the speed of sound varies based on the sound pressure level SPL of a propagating sound wave, the shape of the waveguide 180, and the properties of air included in the waveguide 180. As a sound wave propagates through the waveguide 180, variations in the speed of sound in the air path lead to nonlinear distortions in the sound wave. The nonlinear distortions include, without limitation, intermodulation and harmonic distortions.

In a conventional audio system, such air path distortions degrade the quality of the sound produced via the waveguide, which hinders the ability of the loudspeaker system 180 to generate high fidelity sound. For example, the output sound wave 195 may include extra frequencies that are perceived by the listeners as noise. By contrast, the audio system 100 is designed to mitigate the air path distortions and, consequently, enable the loudspeaker system 160 to generate high fidelity sound at a high SPL.

For explanatory purposes, an electrical signal that specifies a sound wave and a sound wave are both characterized by wave forms and may be referred to herein in a similar manner with respect to the shape and characteristics of the wave form. The shape of the wave form correlates to, without limitation, the SPL of the wave form and a distribution of frequencies included in the wave form. During propagation through the waveguide 180, air path distortions modify the driver sound wave 175. As a result, the distribution of frequencies included in the output sound wave 195 differ from the distribution of frequencies included in both the driver sound wave 175 and the driver signal 155.

To mitigate air path distortions, the audio system 100 includes, without limitation, a pre-correcting engine 140. As shown, the pre-correcting engine 140 is stored in a memory 116 included in the computing machine instance 110. In operation, a processor 112 also included in the computing machine instance 110 executes the pre-correcting engine 140. In alternate embodiments, the computing machine instance 110 may include any amount and type of the memory 118 and any number of the processors 112. Further, any number and type of computing machine instances 110 may implement the pre-correcting engine 140 in any technically feasible fashion. In some alternate embodiments, the computing machine instance 110 may be replaced with any type of cloud computing environment or distributed computing environment.

As shown, the pre-correcting engine 140 receives a target signal 125, waveguide shape parameters 132, and air property parameters 134 and, in response, computes a pre-corrected signal 145. The target signal 125 specifies the output sound that is the ultimate objective of the loudspeaker system 160. Among other things, the target signal 125 is characterized by a time duration and an SPL. For example, the target signal 125 may be a 2 second segment of a song at an SPL of 110 decibels (dB) The pre-correcting engine 140 may receive the target signal 125 in any technically feasible fashion. Further, the target signal 125 may be generated in any technically feasible fashion. For example, an audio engineer could input a 2 second digital signal from a Moving Picture Experts Group Layer-3 Audio (MP3) to a sound card to generate the corresponding analog signal. The audio engineer could then scale the analog signal to the desired SPL to generate the target signal 125.

The waveguide shape parameters 132 specify physical attributes of the waveguide 180 that impact the shape of the sound waves traveling through the waveguide 180. For example, the waveguide shape parameters 132 may include, without limitation, the length of the waveguide 180, the radius of the waveguide 180, and so forth. In a complementary fashion, the air property parameters 134 specify attributes of the air included in the waveguide 180 that contribute to air path distortions. For example, the air property parameters 134 may specify the temperature in the waveguide 180, the humidity in the waveguide 180, and the like.

The pre-correcting engine 140 may receive the waveguide shape parameters 132 and the air property parameters 134 in any technically feasible fashion. For example, in some embodiments, the pre-correcting engine 140 may receive the waveguide shape parameters 132 and the air property parameters 134 from a graphical user interface (GUI). In other embodiments, the pre-correcting engine 140 may receive the waveguide shape parameters 132 via an application programming interface (API) and may set the air property parameters 134 to default values.

The pre-corrected signal 145 enables the audio system 100 to minimize discrepancies between the target signal 125 and the output sound wave 195 that are attributable to air path distortions. To compute the pre-corrected signal 145, the pre-correcting engine 140 virtually propagates the target signal 125 in a reverse direction along a virtual model of the waveguide 180. More precisely, the pre-correcting engine 140 virtual propagates the target signal 125 from the output of the loudspeaker system 160 to the output of the driver 170. To perform such "backpropagation," the pre-correcting engine 140 implements a backpropagation partial differential equation (PDE) that is a modified version of the Burgers' PDE model.

As persons skilled in the art will recognize, the Burgers' PDE model describes wave propagation for progressively planar waves. As a general matter, sound waves propagate as planar waves through many commonly used waveguides, such as cylindrical waveguides, and as almost planar waves though spreading in-conical waveguides. Consequently, the pre-correcting engine 140 may accurately model distortions in a variety of different waveguides 180 using backpropagation-based PDE corrector models. In operation, the pre-correcting engine 140 customizes the backpropagation PDE corrector model to the waveguide 180 based on the waveguide shape parameters 132 and the air property parameters 134. More precisely, the pre-correcting engine 140 replaces variables included in the backpropagation PDE corrector model with the values computed based on the waveguide shape parameters 132 and the air property parameters 134.

The Burgers' PDE model includes, without limitation, terms that model the effects of nonlinear air path distortions, dissipation, and dispersion. Accordingly, the backpropagation PDE corrector model includes, without limitation, terms that model and correct for these effects, namely nonlinear air path distortions, dissipation, and dispersion. For example, the first term in the Burgers' PDE model models what is called the "wave steepening" distortion. The wave steepening distortion effects sound waves with relatively high SPLs as such sound waves travel in a forward direction through the waveguide 180 from the driver 170 to the output of the loudspeaker system 160. As such a sound wave propagates, the positive peaks in the sound wave travel at a speed of sound higher than the negative peaks in the sound wave. The backpropagation PDE corrector model includes terms that reverse the effects of this wave steepening distortion. Consequently, the pre-correcting engine 140 forces the positive peaks in a sound wave to travel at a speed of sound lower than that of the negative peaks in the sound wave. This is achieved by virtually propagating these waveforms in a reverse direction through the waveguide 180.

To generate the pre-corrected signal 145, the pre-correcting engine 140 integrates the backpropagation PDE corrector model for the target signal 125 from the output of the waveguide 180 to the input of the waveguide 180. Subsequently, the pre-correcting engine 140 sets the pre-corrected signal 145 to the result of the integration. In this fashion, the pre-corrected signal 145 is designed to negate the effects of air path distortions. In operation, after propagating through the wave guide 180, the pre-corrected signal 145 evolves into the output sound wave 195 that is a high fidelity reproduction of the target signal 125.

However, as persons skilled in the art will recognize, the driver 170 is associated with a linear response. Consequently, the driver 170 modifies the input driver signal 155 as part of generating the output driver sound wave 175 that drives the waveguide 180. To ensure that the pre-corrected signal 145 is accurately transmitted to the waveguide 180, the computing machine instance 110 implements a driver equalizer 150. The driver equalizer 150 is a band-limited equalizer that compensates for the linear response of the driver 170. The driver equalizer 150 is stored in the memory 116 included in the computing machine instance 110. The processor 112 included in the computing machine instance 110 executes the driver equalizer 150. In alternate embodiments, the driver equalizer 150 may be implemented in any technically feasible fashion, stored in any memory, and executed by any processor.

As shown, the driver equalizer 150 receives the pre-corrected signal 145 and generates the driver signal 155. The driver 170 then receives the driver signal 155 and generates the driver sound wave 175 that drives the waveguide 180. Because the driver equalizer 150 reverses the impact of the driver 170 on the shape of the driver sound wave 175, the driver sound wave 175 is a high fidelity replica of the pre-corrected signal 145. After propagating through the waveguide 180, the driver sound wave 175 evolves into the output sound wave 195 that is the ultimate output of the loudspeaker system 160. The output sound wave 195 is a high fidelity replica of the target signal 125.

In alternate embodiments, the pre-corrected signal 145 may be used in any technically feasible fashion to increase the fidelity of the output sound wave 195 produced by the loudspeaker system 100. For example, in some loudspeaker systems 100 the driver equalizer 150 could be omitted. In such systems, the un-compensated modifications to the pre-corrected signal 145 that are attributable to the driver 150 would reduce the correlation between the output sound wave 195 and the target signal 125. However, the pre-corrected signal 145 would mitigate the effects of air path distortions on the output sound wave 195.

Any number and combination of the computing machine instances 110 may implement the pre-correcting engine 140 and the driver equalizer 150 in any technically feasible fashion. In alternate embodiments, the pre-correcting engine 140 may be implemented independently of the driver equalizer 150. For example, in some embodiments the pre-correcting engine 140 may be included a separate computing machine instance 110 that communicates with a cloud over the Internet. In other embodiments, any portion of the functionality of the pre-correcting engine 140 and/or the driver equalizer 150 may be distributed across any number, including one, of the computing machine instances 110.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. For example, the backpropagation techniques described herein may be applied to mitigate the effects of air path distortions in any type of audio system. Further, in alternate embodiments, the pre-correcting engine 140 may implement a backpropagation model based on any wave propagation model and/or equation. For example, the pre-correcting engine 140 may be modified to implement a backpropagation model that is accurate for waves that are not planar.

Pre-Correcting Air Path Distortions

FIG. 2 is an example of air path distortions introduced as a sinusoidal input sound wave propagates through the waveguide 180 of FIG. 1, according to various embodiments. For explanatory purposes only, the context of FIG. 2 is that a sinusoidal input sound wave is an input to a model of the waveguide 180. A Burgers' partial differential equation (PDE) model 210 is integrated over the length of the waveguide 180 to simulate the evolution of the sinusoidal input sound wave as the sinusoidal input sound wave propagates through the model of the waveguide 180. The resulting virtual output of the waveguide 180 is depicted as a Burgers' predicted sound wave 295. For illustrative purposes, a target sinusoid 225 depicts the desired output of the waveguide 180. The target sinusoid 225 is an ideally scaled version of the sinusoidal input sound wave.

The evolution of a sound wave as observed at a specific distance x along the waveguide 180 may be computed based on the sound wave as defined at the start of the waveguide 180. Such a boundary-value problem may be computed based on the following expression of the Burgers' PDE model 210 using Lagrangian coordinates:

$$\frac{\partial p(x,\tau)}{\partial x} = \frac{\beta p(x,\tau)}{\rho_0 c_0^3}\frac{\partial p(x,\tau)}{\partial \tau} + \frac{\delta}{2c_0^3}\frac{\partial^2 p(x,\tau)}{\partial \tau^2} - b\sqrt{\frac{2}{\pi}}\left(\frac{\partial p(x,\tau)}{\partial \tau} * \frac{1}{\sqrt{\tau}}\right) \tag{1}$$

As shown in FIG. 2 and in equation (1) immediately above, the left hand side of the Burgers' PDE model 210 is the derivative of a pressure signal p(x, τ) with respect to a virtual distance x. In the context of the audio system 100, the pressure signal comprises a model of the pressure of a wave form that propagates in a forward direction along the waveguide 180. The distance x is a distance along the waveguide 180, and τ is the moving time of reference $\tau = t - x/c_0$, where $c_0$ is the speed of sound for unperturbed air. The right hand side of the Burgers' PDE model 210 includes, without limitation, terms that contribute to air path distortion effects, dissipation effects, and distortion effects. As persons skilled in the art will recognize, the first term on the right hand side of the Burgers' PDE model 210 contributes to air path distortion effects. By contrast, the second and third terms on the right hand side of the Burgers' PDE model 210 contribute to dissipation effects and dispersion effects.

The right hand side of the Burgers' PDE model 210 includes parameters that are constant as well as parameters that are variable. For example, the parameter β is the coefficient of nonlinearity and is equal to ½(γ+1), where γ is the ratio of specific heats of air for an adiabatic process. The parameter $\rho_0$ denotes the air density of undisturbed air, and δ corresponds to the sound diffusivity of air. The pre-correcting engine 140 computes values for one or more of the variables included in the right hand side of the Burgers' PDE model 210 based on the waveguide shape parameters 132 and the air properties parameters 134. For instance, the pre-correcting engine 140 computes a value for a boundary layer parameter b based on dimensions of the waveguide 180 and the properties of air internal to the waveguide 180. Further, denoting v as the kinematic viscosity, Pr as the Prandtl constant, μ as the shear viscosity, $\mu_B$ as the bulk viscosity, and R as the radius of the waveguide 180, the pre-correcting engine 140 computes the values for parameters δ and b as:

$$\delta = v\left(\frac{4}{3} + \frac{\mu_B}{\mu} + \frac{\gamma - 1}{Pr}\right), \tag{2}$$

$$b = \frac{1}{2R}\sqrt{\frac{2v}{c_0^2}}\left[1 + \frac{\gamma - 1}{\sqrt{Pr}}\right] \tag{3}$$

The Burgers' predicted sound wave 295 illustrates the effects of air path distortions. In particular, the Burgers' predicted sound wave 295 includes frequencies that are not included in the target sinusoid 225 and, consequently, corrupt the shape of the Burgers' predicted sound wave 295. For instance, the positive peak in the Burgers' predicted sound wave 295 arrives before the corresponding positive peak of the target sinusoid 225. Further, the negative peak in the Burgers' predicted sound wave 295 arrives later than the corresponding negative peak included in the target sinusoid 225.

In general, to enable the loudspeaker system 160 to provide a high fidelity replica of the target signal 125 as the output sound wave 195, the audio system 100 includes the pre-correcting engine 140. The pre-correcting engine 140 receives the target signal 125 and compensates for the effects of air path distortions on the target signal 125 to generate the pre-corrected signal 145. The driver equalizer 150 and the driver 170 then process the pre-corrected signal 145 to generate the driver sound wave 175 that is a high fidelity replica of the pre-corrected signal 145. As the driver sound wave 175 propagates through the waveguide 180, air path distortions modify the driver sound wave 175, reversing the predistortions introduced in the driver sound wave 175. The resulting output sound wave 195 is a high fidelity replica of the target signal 125.

FIG. 3 is a more detailed description of the pre-correcting engine 140 of FIG. 1, according to various embodiments. As shown, the pre-correcting engine 140 includes, without limitation, a backpropagation partial differential equation (PDE) 310, an integrator 330, backpropagation parameters 340, an initial condition 350, and a solution 360. In alternate embodiments, the pre-correcting engine 140 may implement any technically feasible algorithm to model a corrector that compensates for air path distortions. For example, in some embodiments, the pre-correcting engine 140 may implement a model that is applicable to wave forms that are not planar.

The backpropagation PDE corrector model 310 is derived from the Burgers' PDE model 210 and is expressed in Lagrangian coordinates as:

$$\frac{\partial p(x,\tau)}{\partial x} = -1 \times \left[\frac{\beta p(x,\tau)}{\rho_0 c_0^3}\frac{\partial p(x,\tau)}{\partial \tau} + \frac{\delta}{2c_0^3}\frac{\partial^2 p(x,\tau)}{\partial \tau^2} - b\sqrt{\frac{2}{\pi}}\left(\frac{\partial p(x,\tau)}{\partial \tau} * \frac{1}{\sqrt{\tau}}\right)\right] \tag{4}$$

The left hand side of the backpropagation PDE corrector model 310 is the derivative of a pressure signal p(x, τ) with respect to a virtual distance x. The pressure signal comprises a model of the pressure of a wave form that virtually propagates in the reverse direction towards the driver 170 along the waveguide 180. The distance x is a distance along the waveguide 180, and τ is the moving time of reference $\tau = t - x/c_0$, where $c_0$ is the speed of sound for unperturbed air. The right hand side of the backpropagation PDE corrector model 310 equals the product of the right hand side of the Burgers' PDE model 210 and negative one. As a result of the negative one multiplier, the backpropagation PDE corrector model 310 behaves as a nonlinear corrector for the Burgers' PDE model 210 and provides a distortion negating mechanism. In particular, the first term included in the right hand side of the backpropagation PDE corrector model 310 negates the nonlinearity effects of air path distortions while the last term attempts to negate the effects of dispersion.

In operation, the pre-correcting engine 140 configures the integrator 330 to integrate the backpropagation PDE corrector model 310 over the length of the waveguide 180 to generate the pre-corrected signal 145. The integrator 330 may implement any technically feasible integration technique as known in the art. For example, in some embodiments, the integrator 330 may implement the Runge-Kutta algorithm for spatial integration. The pre-correcting engine 140 may configure the integrator 330 in any technically feasible fashion that is consistent with customizing the integrator 330 and the backpropagation PDE corrector model 310 to apply to the waveguide 180. For example, in some embodiments, the pre-correcting engine 140 computes one or more of the backpropagation parameters 340 and the limits of the integration interval based on the waveguide shape parameters 132 and the air property parameters 134.

As shown, the backpropagation parameters 340 specify, without limitation, values for constants and variables that impact the backpropagation process. Among other things, the backpropagation parameters 340 include values for constants and variables in the backpropagation PDE corrector model 310. For instance, the backpropagation parameters 340 include the boundary layer parameter b. The pre-correcting engine 140 computes the value of the boundary layer parameter b based on the dimensions of the waveguide 180 and the air internal to the waveguide 180. The dimensions of the waveguide 180 may be specified by the waveguide shape parameters 132 and the properties of the air included in the waveguide 180 may be specified by the air property parameters 134. The backpropagation parameters 340 also include a value for a parameter y that specifies the ratio of specific heats for air assuming an adiabatic process. The pre-correcting engine 140 computes the values for a parameter $\beta$ that specifies the coefficient of nonlinearity included in the backpropagation PDE corrector model 310 as $\beta=\frac{1}{2}(\gamma+1)$.

The backpropagation parameters 340 also include values for variables and constants that impact the manner in which the pre-correcting engine 140 executes the backpropagation process. For example, in some embodiments, the pre-correcting engine 140 may implement a grid in space and time as part of the backpropagation process. Further, the pre-correcting engine 140 may implement finite differences to construct the required derivatives of the pressure signal $p(x, \tau)$. In such embodiments, the backpropagation parameters 340 may include a $c_{max}$ parameter that specifies an upper bound on the variation of the speed, and the pre-correcting engine 140 may compute the grid spacing as $\Delta x \geq c_{max}\Delta t$, where $\Delta t$ is the sampling time.

As shown in FIG. 3, the values of the backpropagation parameters 340 for a particular waveguide 180 and backpropagation process include, without limitation:

1. radius of the waveguide 180 R=12.7 mm
2. speed of sound for unperturbed air $c_0=346.57\ ms^{-1}$
3. maximum grid spacing $c_{max}=2*c0$
4. grid spacing $\Delta x=7.2$ mm
5. pressure $P_0$ of 101325 Pa
6. air density of undisturbed air $\rho=1.2\ kg\ m^{-3}$
7. bulk viscosity $\mu_B=0.6\ \mu$
8. coefficient of non linearity $\beta=1.2$ (dimensionless),
9. ratio of specific heats for an adiabatic process $\gamma=1.4$ (dimensionless)
10. Prandtl constant Pr=0.707 (dimensionless)
11. sound diffusivity of air $\delta=3.84\times10^{-5}\ m^2s^{-1}$
12. kinematic viscosity $\nu=1.53\times10^{-5}\ m^2s^{-1}$
13. boundary layer parameter $b=0.000929862\ m^{-1}s$
14. shear viscosity $\mu=18.46\times10^{-6}\ kg\ m^{-1}s^{-1}$ In alternate embodiments, the backpropagation parameters 340 may include any number and type of constants and variables that are relevant to the propagation of wave forms through the waveguide 180. Further, the pre-correcting engine 140 may determine values for the backpropagation parameters 340 in any technically feasible fashion. The pre-correcting engine 140 may use any number, including zero, of the values for the backpropagation parameters 340 to implement any number and type of algorithms included in the backpropagation process. Such algorithms may include, without limitation, any combination of algorithms that compute derivatives, perform spatial integrations, compute convolutions, compute fractional derivatives, solve the backpropagation PDE corrector model 310 numerically, and so forth.

The pre-correcting engine 140 configures the integrator 330 to integrate the backpropagation PDE corrector model 310 over the limits of integration corresponding to the length of the waveguide 180. More specifically, the pre-correcting engine 140 sets the initial condition 350 $p(0, \tau)$ to the target signal 125 and the end condition to $p(x, \tau)$, where x is the length of the waveguide 180. The integrator 330 computes the solution 360 to the backpropagation PDE corrector model 310 and as the solution 360 $p(x, \tau)$. Finally, the pre-correcting engine 140 sets the pre-corrected signal 145 to the solution 360. In this fashion, the pre-corrected signal 145 is the result of virtually propagating the target signal 125 through a virtual model of the waveguide 180 specified by the backpropagation PDE corrector model 310. In general, the pre-corrected signal 145 includes the compensator-induced distortions that should ideally correct for the air path distortions on the target signal 125. For example, in some embodiments, the pre-corrected signal 145 is generated such that the positive peaks of a sound waveform are forced to travel at a speed of sound lower than that of the negative peaks of the sound waveform.

As described previously herein, the pre-corrected signal 145 drives the cascade of the driver equalizer 150 and the driver 170. Since the combined response of the driver equalizer 150 and the driver 170 is flat, the driver sound wave 175 with which the driver 170 drives the waveguide 180 is a high fidelity replica of the pre-corrected signal 145. In particular, the driver sound wave 175 includes compensator-induced distortions that negate the effects of air path distortions during forward propagation through the waveguide 180. As a result, the output sound wave 195 generated by the physical propagation of the driver sound wave 175 in the forward direction through the wave guide 180 is a high fidelity replication of the target signal 125. As shown, the resemblance between the output sound wave 195 and the target signal 125 is significantly closer than the resemblance between the Burgers' predicted sound wave 295 and the target signal 125.

Figure 4:
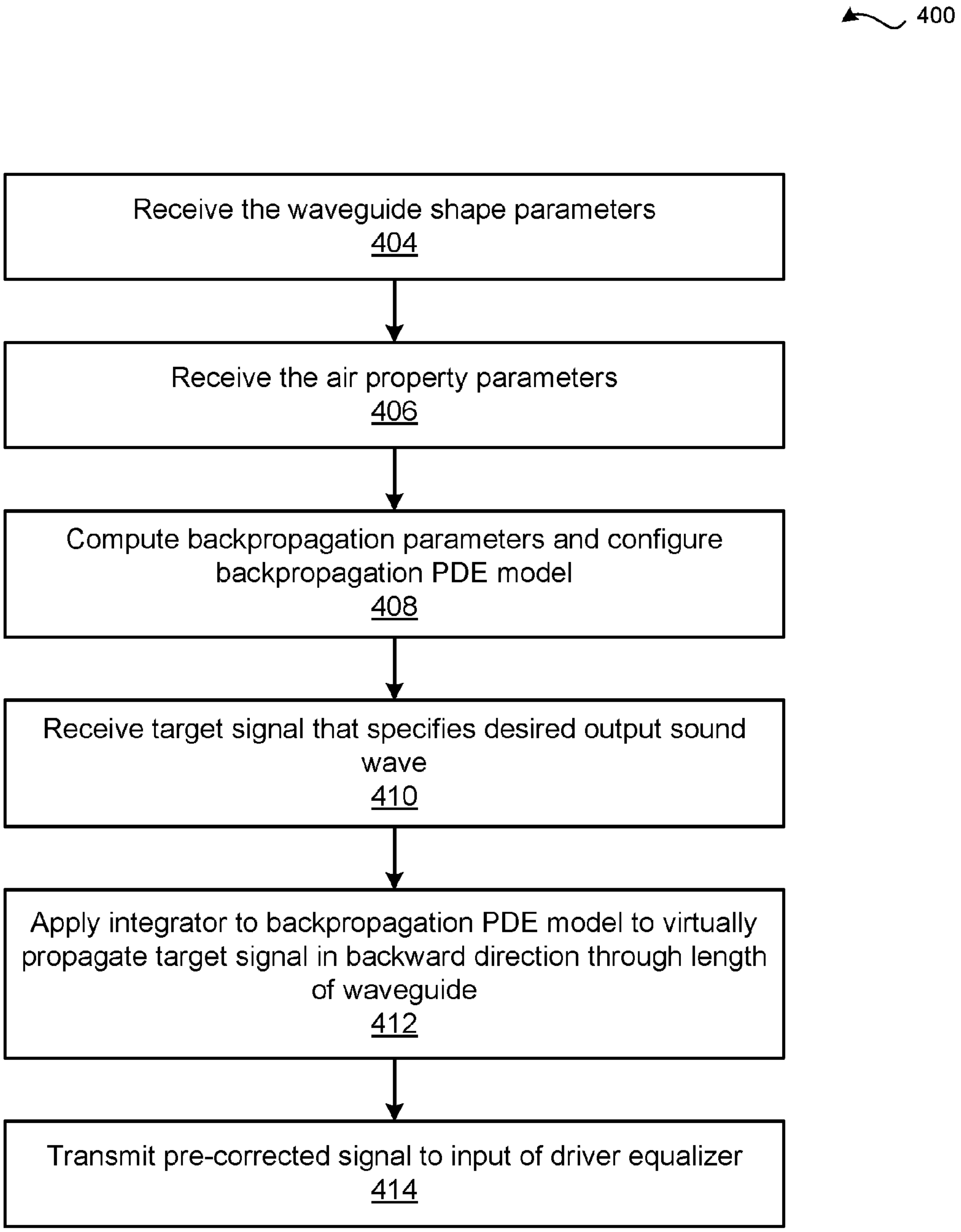
FIG. 4 is a flow diagram of method steps for increasing the fidelity of sound emitted from an audio system, according to various embodiments.

FIG. 4 is a flow diagram of method steps for increasing the fidelity of sound emitted from an audio system, according to various embodiments. Although the method steps are described with reference to the systems of FIGS. 1-3, persons skilled in the art will understand that any system configured to implement the method steps, in any order, falls within the scope of the various embodiments.

As shown, a method 400 begins at step 404, where the pre-correcting engine 140 receives the waveguide shape parameters 132. The waveguide shape parameters 132 specify physical attributes of the waveguide 180 that impact the shape of the waves traveling through the waveguide 180. For example, the waveguide shape parameters 132 may include, without limitation, the length of the waveguide 180, the radius of the waveguide 180, and so forth. The pre-correcting engine 140 may receive the waveguide shape parameters 132 in any technically feasible fashion. For example, the pre-correcting engine 140 may receive the waveguide shape parameters 132 from a graphical user interface (GUI).

At step 406, the pre-correcting engine 140 receives the air property parameters 134. The air property parameters 134 specify attributes of the air included in the waveguide 180 that contribute to air path distortions. For example, the air property parameters 134 may specify the temperature in the waveguide 180, the humidity in the waveguide 180, and so forth. The pre-correcting engine 140 may receives the air property parameters 134 in any technically feasible fashion. For example, in some embodiments, the pre-correcting engine 140 may receive the air property parameters 134 from a graphical user interface (GUI). In other embodiments, the pre-correcting engine 140 may be configured to set the air property parameters 134 to default values.

At step 408, the pre-correcting engine 140 computes values for one or more of the backpropagation parameters 340 and configures the backpropagation partial differential equation (PDE) 310. More precisely, the pre-correcting engine 140 computes the values of any number of the backpropagation parameters 340 based on the waveguide shape parameters 132 and the air property parameters 134.

The backpropagation parameters 340 may include values for constants and variables that are included in the backpropagation PDE corrector model 310 directly and indirectly as well as parameters that are specific to the backpropagation process. In this fashion, the pre-correcting engine 140 customizes the backpropagation PDE corrector model 310 to describe the evolution of sound waves as the sound waves virtual propagate in a reverse direction along the specific waveguide 180. In particular, the customized backpropagation PDE corrector model 310 includes terms that compensate for the air path distortions that modify sound waves traveling in a forward direction through the specific waveguide 180.

For instance, as a sound wave with a relatively high SPL travels in a forward direction through the waveguide 180 from the driver 170 to the output of the loudspeaker system 160, the sound wave typically experiences a wave steepening distortion. As part of such a wave steepening distortion, because the speed of sound varies with the sound pressure levels of the waveforms, the positive peaks travel faster than the negative peaks. The backpropagation PDE corrector model 310 includes terms that correct the effects of the wave steepening distortion. In particular, the backpropagation PDE corrector model 310 modifies a sound waveform such that the positive peaks in the sound waveform are forced to travel at a speed of sound lower than that of the negative peaks in the sound waveform. This is achieved by virtually propagating these waveforms in a reverse direction through the waveguide 180.

At step 410, the pre-correcting engine 140 receives the target signal 125 that specifies the desired output sound wave 195. Among other things, the target signal 125 is characterized by a time duration and a SPL. For example, the target signal 125 may be a 2 second segment of a song at an SPL of 137 decibels (dB) The pre-correcting engine 140 may receive the target signal 125 in any technically feasible fashion. Further, the target signal 125 may be generated in any technically feasible fashion. For example, an audio engineer could input a 2 second digital signal from a Moving Picture Experts Group Layer-3 Audio (MP3) to a sound card to generate the corresponding analog signal. The audio engineer could then scale the analog signal to the desired SPL to generate the target signal 125.

At step 412, the pre-correcting engine 140 applies the integrator 330 to the backpropagation PDE corrector model 310. More specifically, the pre-correcting engine 140 sets the initial condition 320 of the integrator 150 to the target signal 125. The pre-correcting engine 140 then configures the integrator 150 to integrate the backpropagation PDE corrector model 310 from the initial condition 320 in a reverse direction along the length of the waveguide 180. Accordingly, the integrator 150 virtually propagates the sound wave corresponding to the target signal 125 from the output of the waveguide 180 to the input of the waveguide 180. After propagating the sound wave through the length of the waveguide 180, the solution 360 computed by the integrator 150 is the pre-corrected signal 145.

Because the backpropagation PDE corrector model 310 compensates for the air path distortions, the pre-corrected signal 145 mitigates the effects of the air path distortions. In particular, when a sound wave corresponding to the pre-corrected signal 145 propagates through the waveguide 180, the output sound wave 195 is a high fidelity replica of the target signal 125. By contrast, if a sound wave corresponding to the target signal 145 were to propagate through the waveguide 180, then the output sound wave 195 would include corrupting air path distortions. Such corrupting air path distortions would undesirably alter the shape of the output sound wave 195 relative to the target signal 145.

At step 414, the pre-correcting engine 140 transmits the pre-corrected signal 145 to the input of the driver equalizer 150. The pre-correcting engine 140 may transmit the pre-corrected signal 145 in any technically feasible fashion. The driver equalizer 150 is a band-limited equalizer that compensates for the linear response of the driver 170. After the driver equalizer 150 compensates the pre-corrected signal 145, the driver equalizer 150 relays the resulting signal to the driver 170 and, in response, the driver 170 generates the driver sound wave 175. Notably, the driver sound wave 175 is a high fidelity replica of the pre-corrected signal 145. After propagating through the waveguide 180, the driver sound wave 175 evolves into the output sound wave 195. The output sound wave 195 is a high fidelity replica of the target signal 125 and is the ultimate output of the loudspeaker system 160.

In alternate embodiments, the pre-corrected signal 145 may be used in any technically feasible fashion to increase the fidelity of the output sound waves 195 produced by the loudspeaker system 100. For example, in some loudspeaker systems 100 the driver equalizer 150 may be omitted. In such systems, the un-compensated modifications to the pre-corrected signal 145 that are attributable to the driver 150 would be reflected in the correlation between the output sound wave 195 and the target signal 125. However, the air path distortions included in the output sound wave 195 would be minimized.

In sum, the disclosed techniques may be used to compensate for air path distortions introduced in waveguides. In operation, a pre-correcting engine receives a target signal at the desired sound pressure level, parameters that specify the shape of a waveguide, and parameters that specify properties of the air in the waveguide. The pre-correcting engine virtually propagates the target signal in a reverse direction to compute a pre-corrected signal. More precisely, the pre-correcting engine integrates a backpropagation partial differential equation (PDE) model from the output of the waveguide in a reverse direction along the length of the waveguide. The backpropagation PDE corrector model is derived from the Burgers' PDE model that describes wave propagation for planar wave forms, such as sound waves in a cylindrical waveguide. The backpropagation PDE corrector model includes terms that, when applied to the target signal, corrects the effects of air path distortions on the target signal.

To drive a loudspeaker system that includes the waveguide, the pre-corrected signal is then transmitted to a driver equalizer that compensates for distortions introduced by the driver and generates a driver signal. The driver converts the driver signal to a driver sound wave. Because the combined response of the driver equalizer and the driver is flat, the driver sound wave is a high fidelity replica of the pre-corrected signal. As the driver sound wave propagates through the waveguide, the driver sound wave is modified into an output sound wave that is ultimately produced by the loudspeaker system. Notably, the pre-corrected distortions in the driver sound wave negate the distortions introduced during the propagation through the waveguide. As a result, the output sound wave is a high fidelity replica of the target signal.

At least one advantage of the disclosed approach is that, audio systems may implement a pre-correcting engine to generate sounds with both signal pressure levels and high fidelity via waveguides. In particular, the pre-correcting engine effectively mitigates air path distortions attributable to variations in the speed of sound within a waveguide. Consequently, sound output from audio systems that include the pre-correcting engine do not exhibit wave steepening distortions that typically corrupt sound output from conventional audio systems that are coupled to waveguides. Notably, the pre-correcting engine may be implemented in conjunction with any driver. Further, the pre-correcting engine may be customized to generate pre-corrected signals for a variety of waveguides.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for increasing a fidelity of sound emitted from an audio system, the method comprising:

configuring a propagation distortion compensation model based on one or more parameters associated with a waveguide included in the audio system, wherein the propagation distortion compensation model corrects for a mechanism that generates air path distortions attributable to wave propagation in waveguides;

applying the propagation distortion compensation model to a target signal to generate a pre-corrected signal; and transmitting the pre-corrected signal to the audio system for generating sound corresponding to the target signal.

2. The method of claim 1, wherein the air path distortions result in at least one of intermodulation and harmonic distortions.

3. The method of claim 1, wherein the propagation distortion compensation model comprises a backpropagation partial differential equation (PDE) corrector model derived from a Burgers' equation model.

4. The method of claim 3, wherein applying the propagation distortion compensation model comprises integrating the backpropagation PDE corrector model over a length of the waveguide spanning from a pre-specified location inside the waveguide that emits sound to a location of an audio source that drives the waveguide.

5. The method of claim 1, wherein the one or more parameters describe at least one of a shape of the waveguide and a property of air within the waveguide.

6. The method of claim 1, wherein the target signal includes a sound pressure level and a time duration.

7. The method of claim 1, wherein applying the propagation distortion compensation model comprises delaying a positive peak in the target signal to generate a corresponding positive peak in the pre-corrected signal, and advancing a negative peak in the target signal to generate a corresponding negative peak in the pre-corrected signal.

8. The method of claim 1, wherein transmitting the pre-corrected signal comprises transmitting the pre-corrected signal to a driver equalizer or a driver.

9. A non-transitory computer-readable storage medium including instructions that, when executed by a processor, cause the processor to increase a fidelity of sound emitted from an audio system by performing the steps of:

configuring a propagation distortion compensation model based on one or more parameters associated with a waveguide included in the audio system, wherein the propagation distortion compensation model corrects for a mechanism that generates air path distortions attributable to wave propagation in waveguides;

virtually propagating a target signal in a reverse direction from a pre-specified location inside the waveguide that emits sound to a location of an audio source based on the propagation distortion compensation model to generate a pre-corrected signal; and transmitting the pre-corrected signal to the audio system for generating sound corresponding to the target signal.

10. The non-transitory computer-readable storage medium of claim 9, wherein the air path distortions result in at least one of intermodulation and harmonic distortions.

11. The non-transitory computer-readable storage medium of claim 9, wherein the propagation distortion compensation model comprises a backpropagation partial differential equation (PDE) corrector model derived from a Burgers' equation model.

12. The non-transitory computer-readable storage medium of claim 11, wherein virtually propagating the target signal comprises spatially integrating the backpropagation PDE corrector model based on a Runge-Kutta algorithm.

13. The non-transitory computer-readable storage medium of claim 9, wherein the one or more parameters describe at least one of a length of the waveguide, a radius of the waveguide, a temperature internal to waveguide, and a humidity internal to the waveguide.

14. The non-transitory computer-readable storage medium of claim 9, wherein the air path distortions correlate to sound pressure levels associated with sound waves propagating through the waveguide.

15. The non-transitory computer-readable storage medium of claim 9, wherein the target signal includes a sound pressure level and a time duration.

16. The non-transitory computer-readable storage medium of claim 9, wherein virtual propagating the target signal comprises delaying a positive peak in the target signal to generate a corresponding positive peak in the pre-corrected signal, and advancing a negative peak in the target signal to generate a corresponding negative peak in the pre-corrected signal.

17. A system configured to increase a fidelity of sound emitted from an audio system, the system comprising:

a memory storing a pre-correcting application; and a processor that is coupled to the memory and, when executing the pre-correcting application, is configured to:

configure a backpropagation partial differential equation (PDE) model based on one or more parameters associated with a waveguide included in the audio system, wherein the backpropagation partial differential equation (PDE) model includes one or more terms that correct for a mechanism that generates air path distortions attributable to wave propagation in waveguides;

spatially integrate a target signal based on the backpropagation PDE corrector model to generate a pre-corrected signal; and transmit the pre-corrected signal to the audio system for generating sound corresponding to the target signal.

18. The system of claim 17, wherein the air path distortions result in at least one of intermodulation and harmonic distortions.

19. The system of claim 17, wherein the one or more parameters describe at least one of a length of the waveguide, a radius of the waveguide, a temperature internal to waveguide, and a humidity internal to the waveguide.

20. The system of claim 17, wherein the air path distortions are attributable to variations in the speed of sound of high sound pressure waves within the waveguide.

* * * * *